United States Patent [19]

Byers et al.

[11] Patent Number: 4,995,058
[45] Date of Patent: Feb. 19, 1991

[54] WIRELINE TRANSMISSION METHOD AND APPARATUS

[75] Inventors: Terry B. Byers, Yorktown, Conn.; Vladimir Vaynshteyn, Houston, Tex.

[73] Assignee: Baker Hughes Inc., Houston, Tex.

[21] Appl. No.: 307,901

[22] Filed: Feb. 7, 1989

Related U.S. Application Data

[63] Continuation-in-part of Ser. No. 117,935, Nov. 4, 1987, abandoned, which is a continuation of Ser. No. 876,790, Jun. 20, 1986, abandoned.

[51] Int. Cl.$^5$ .......................... H04J 3/00; G01V 1/00
[52] U.S. Cl. ........................................ 375/23; 375/37; 340/861
[58] Field of Search .................... 375/17, 22, 23, 99, 375/101; 370/9, 91; 340/853, 858, 861

[56] References Cited

U.S. PATENT DOCUMENTS

| | | | |
|---|---|---|---|
| 1,936,947 | 11/1933 | Morgenstern et al. | 375/36 |
| 2,444,429 | 7/1948 | Cleeton | 375/23 |
| 2,448,027 | 8/1948 | Grieg | 375/23 |
| 4,348,671 | 9/1982 | Nussbaum | 340/853 |
| 4,598,412 | 7/1986 | Yoshida | 375/99 |
| 4,672,605 | 6/1987 | Hustig et al. | 370/76 |
| 4,685,114 | 8/1987 | Welling | 370/9 |

Primary Examiner—Benedict V. Safourek
Assistant Examiner—Christopher O. Edwards
Attorney, Agent, or Firm—Joseph A. Walkowski; Michael Polacek

[57] ABSTRACT

In a wireline data transmission system for passing data between downhole and surface locations in a wellbore, a system for transmitting data at a frequency above the relatively low roll of frequency of a wireline permits higher data rates to be transmitted over the wireline than would be possible using standard digital data formats. The present system utilizes short duration pulses which are placed on the wireline in conformity to the transition edge between voltage levels in a typical digital data format, and thus transmits the digital data over the wireline in a manner which is not adversely affected by the phase shifting which normally occurs when bi-level voltage data formats are used for data transmission over a wireline. The short duration pulses are placed on the wireline at a time position in a data format that corresponds to the beginning of a bit period and the pulse width is such that it only occupies a fraction of the bit period so that any phase shifting on the pulse does not shift the pulse into a succeeding bit period to thereby adversely affect data interpretation.

20 Claims, 4 Drawing Sheets

WIRELINE TRANSMISSION METHOD AND APPARATUS

CROSS-REFERENCE TO RELATED APPLICATION

This application is a continuation in part of co-pending application Serial No. 117,935, filed Nov. 4, 1987, which is a continuation of Ser. No. 876,390, filed June 20, 1986, now abandoned.

BACKGROUND OF THE INVENTION

1. Field of the Invention

This invention pertains to data communications and particularly to data communications on a wireline such as one employed in an oil or gas wellbore application.

2. Description of the Prior Art

It is common in an oil or gas wellbore application to transmit and receive electrical digital and data control signals between surface electronics and a downhole electronics package via a wireline of one or more conductors connecting the two. Such signals are typically used to remotely control the functions of various downhole devices such as sensors for detecting borehole parameters as well as tools and devices for performing functional operations in the borehole such as setting equipment or operating testers, motors, directional drilling equipment or the like, which may be operable in stages and in any event requiring a plurality of differing control signals at different times. Likewise, it is desirable to transmit information indicative of the operation of downhole devices or parameters detected or measured downhole, to the surface over the same conductor path. It is customary in such downhole operations to utilize a sheathed or armored cable which includes a single conductor as a core insulated from a protective conductive sheathing, which also acts as another electrical circuit path in conjunction with the core conductor to provide a conductive pair. Such so called single conductor wireline cables, or similarly constructed multi-conductor cables, are almost exclusively used to operate downhole electrical devices because of a variety of reasons associated with the space limited and rigorous environment of a wellbore. In such oil and gas wellbore operations, a wellbore depth of many thousands of feet is not uncommon. In communicating between the surface and downhole in a wellbore over a wireline cable, control signals and data signals are normally converted to a digital code comprising a plurality of "0" and "1" bits that are transmitted at rates up to a maximum of 4 Kbits/second. A "1" is typically represented by a voltage sequence. That is, the "1" and "0" bits are represented by a sequencing of voltage levels. A "1" bit could be represented by a single first voltage level (e.g., a relatively high level) and a "0" bit could be represented by a single second level (e.g., a relatively low level). In the non-return-to-zero (NRZ) format, a "0" digit is commonly represented by a predetermined lower level voltage which may or may not be zero volts. A "1" is represented by a higher predetermined voltage level. Each bit has a predetermined time interval associated with it. Two or more successive bits of the same kind, either "0" or "1", is represented by no change of voltage. There is only a voltage change when there is a change from a "0" to a "1" or a "1" to a "0". It is understood that there are other modulation schemes in common use, such as bi-phase voltage sequences and delayed modulation sequences, which are more complex than NRZ. However, the problems imposed by the wireline as discussed herein affect them all.

Continuing using NRZ as an example, a coded digital word would appear as a variable period, two-level rectangular wave voltage varying between a first voltage level and a second voltage level. The control and data information is carried by the changing voltage levels and by the number of bit time periods between the occurrences of the voltage changes. Hence, a conventional receiver or detector detects the first and second levels and the times of occurrence so as to be able to decode the transmission. As mentioned previously, the transmission and receiver scheme just discussed operates well when the rate of transmission does not exceed about 4 Kbits/second or the wireline is relatively short.

However, the wireline transmission medium does cause a problem when the transmission is over a relatively long length or as the data rate increases. That is, the detection and distinguishing of the two voltage levels is impaired by distortions caused by the medium. Distortions become more acute for faster bit rates, where the periods at each of the two voltage levels are very short. For example, the frequency characteristic of a typical single conductor wireline used for downhole application has about a 3 db loss at 5.6 Khz for a 30,000 foot length. At higher frequencies, the loss is significantly greater. When the loss reaches this 3 db level, it is referred to as a "cut off" or "roll off" frequency.

Cut off is measured by increasing the frequency of a signal over a medium until the signal falls off or is attenuated to one half its transmitted amplitude due to losses in the medium. In the present data transmission system, a 9.6 KBaud data rate is being used. Ordinarily, good data transmission design practice would require a transmission medium having a cut off frequency of at least 1½ times the data rate being used. This would dictate a transmission medium having a 14.4 Khz cut off frequency whereas the best low loss wireline in common usage in oil field work has a 5.6 Khz cut off, such wirelines being designed primarily for their mechanical capabilities as opposed to high frequency transmission characteristics, to accommodate the physically hostile borehole environment.

Distortion consists primarily of amplitude losses and phase error. It is possible to overcome amplitude losses by making the voltage level between the two bit types be greater than for shorter line transmission. For example, a typical voltage level for a "0" bit could be 0 volts and a typical voltage level for a "1" bit could be 30 volts, a 30-volt difference. This difference could be doubled or made even greater so as to increase transmission efficiency for a longer transmission distance. However, there are practical limits as to what the voltage differences can be, particularly in the presence of a higher rate of transmission, such as 16 Kbits/second.

An even more significant source of error, as the wireline length and/or data rates increase, is the phase errors of the received pulses. Phase error in this case describes the time distortion of a pulse by the transmitting medium so as to change the relative position of the pulses in a data stream from that of the original data stream. Significant phase error can make the time position of a pulse ambiguous and result in a data error. The amount of phase distortion incurred is proportional to the characteristics of the medium, transmission rate, modulation scheme and the particular data being sent at a particular time. Phase error is the principal limitation to high speed data transmission over wireline, limiting normal operation to less than approximately 4,000 bits per second.

In developing the process, it was observed that the instantaneous magnitude of phase distortion in a wireline being operated significantly above cut-off frequency is directly related to the rate of change of the average level of signal present on the wireline. This change occurs as a result of the data signal being impressed on the wireline. All data streams contain a DC or average component associated with them which is data dependent. A string of "ones" has a different level than a string of "zeros" and a string of ones and zeros, which would be typical of data, will have something in between. This average component of the data pushes and pulls the average signal level on the wireline up and down as the data changes and phase distortion results.

The amount of phase distortion present at any instant of time is dependent on the data being sent, the data coding scheme used, and how high the operating frequency is above the cut-off frequency. Oil field cable, whether single or multi conductor, has characteristics which shift the leading and trailing edges of a signal in the time domain to generate phase error. If the occurrence of a leading or trailing edge is shifted forward or backward greater than one-half a bit time, it introduces an ambiguity into the data recovery process and there will be some bits that cannot be uniquely determined as to whether they are a one or a zero. This can be resolved to a certain degree by using error correcting codes or by establishing certain conditions into the data that the receiving circuitry can examine to decode ambiguities, but any such scheme complicates the data recovery process and can significantly increase the overall complexity of the receiver.

Other than using error correcting codes, algorithms or other schemes for manipulating data received to eliminate transmission induced ambiguities, little has been done to correct this particular problem associated with wireline cable in the borehole environment in a more simple and less complex manner.

Therefore, it is an object of the present invention to provide an improved method of transmitting digital data in a borehole data transmission system between the surface and downhole at data rates above wireline roll-off frequency.

It is another object of the present invention to provide an improved method of transmitting digital signals in a wellbore environment using a wireline, by the generation of a waveshape, for representing the digital data, that is not dependent on the alternate data states being represented by alternate voltage levels, but rather by representing each data bit leading transition edge by a high frequency pulse, thus preserving the phase relationship so that data can be recovered.

SUMMARY OF THE INVENTION

With these and other obJects in view, the present invention involves the use of a wireline transmission system, which includes a transmitter, a receiver and usually a long wireline cable connected therebetween. Data is generated either at the surface location, e.g., as a command signal, or at the downhole location, resulting from measurement of a downhole parameter, for transmission to the other location. The data signal may be in the form of one of a variety of digital coding schemes, such as NRZ, utilizing a bi level data bit state, which can be presented to the transmitter in conventional form where a "0" bit is represented by a first predetermined voltage level and a "1" bit is represented by a second predetermined voltage level Each bit has a predetermined time interval or bit period. For example, if the coding scheme is NRZ and a high voltage level is used to represent a "1", when there is a change from "0" bit to a "1" bit, there is a positive going voltage rise leading edge to the "1" bit, and where there is a change from a "1" bit to a "0" bit, there is a negative-going voltage drop leading edge to the "0" bit. In addition, there is usually a predetermined initial or start-up voltage level sequence at the beginning of each data burst to help locate the beginning of the data frame at the receiving location.

Note: Although it is common practice to format digital data in a bi level state, it should be noted that the present transmission system would have applicability to any multi-level or multi state format that produces transitions in a signal being sent over a wireline data transmission system.

A processor at the transmission end of the system includes means for recognizing the start up sequence and for generating a short duration pulse corresponding to the leading edge of the sequence or to any transitions in the start up sequence. This provides synchronization for the following data bits in the frame. In similar fashion, the transmitter recognizes the ensuing data bits and generates a short duration pulse corresponding to each transition edge between a "1" data bit and a "0" data bit and visa versa. These short duration pulses are then applied to the wireline cable and thereby transmitted to the receiver. The processor at the surface sees the data in a time shifted relation to the data transmitted, in proportion to the wireline length and the delay characteristics of the particular cable. This delay causes no particular recognition or decoding difficulty. The frequency or pulse width of the short duration pulse is chosen so as to occupy a relatively small portion of the front end of a bit period. Thus, any residual decay in the pulse at the receiving end of the system, due to phase distortion on the line, will fall substantially within its own bit period frame and thus will not be seen as a voltage level in the succeeding bit period so as to be misinterpreted as representing voltage in the succeeding bit period.

The receiver then detects these short duration pulses on the wireline at a remote location and, through discrimination circuits, filters any noise from the received data signal stream. The filtered narrow pulses are then passed to a processor which detects the first start of frame narrow pulse and generates the predetermined voltage level for the start-up sequence until another short duration pulse is detected; at which time the appropriate corresponding voltage is generated. When the next short duration pulse is detected, the output toggles back to the original voltage. This procedure of toggling on transitions is continued throughout the data stream, at which time the processor is returned to a condition preparatory to recognizing the next start-up sequence. Thus, the data stream is reconstituted into its original two-level data format.

BRIEF DESCRIPTION OF THE DRAWINGS

For a more complete understanding of the present invention, and for further objects and advantages thereof, reference may now be had to the following description, when taken in conjunction with the accompanying drawings, in which.

DESCRIPTION OF THE PREFERRED EMBODIMENTS

Figure 1:
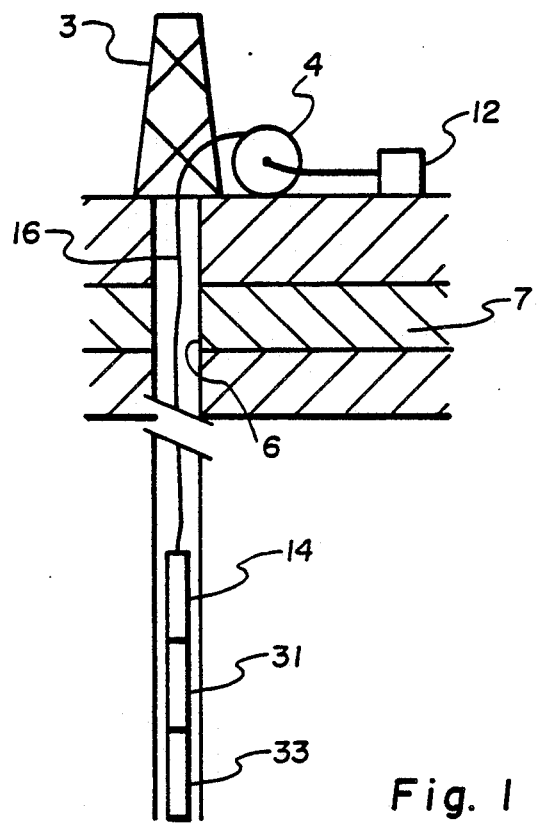
FIG. 1 is a schematic representation of a wellbore and associated apparatus for operating equipment in the wellbore in accordance with the present invention.

First referring to FIG. 1 of the drawings, a wellbore operation is shown schematically, including a derrick, drilling platform 3 or the like, for providing a work platform to facilitate borehole operations. A wireline cable spool 4 is shown having a wireline 16 emanating therefrom and extending into a wellbore 6 which has been drilled into earth formations 7. Wellbore tool 31, 33 are shown suspended in the wellbore, which tools may be located therein for the purpose of performing wellbore operation or for detecting wellbore parameters. In one case, it is desirable to have accurate real time access to information at the surface, which is indicative of the status of a borehole operation or of a downhole detected parameter. In another case, control signals passing from the surface to downhole locations are not distorted to the extent that misinterpretation of the data occurs. In yet another case, a combination of these conditions may exist. In any event, the accurate transmission of digitally encoded data between downhole and the surface of a well at a data rate above one and a half times the cut off frequency of a typical wireline conductor path is desirable. Oftentimes the transmission of such borehole data signals is accomplished during a borehole drilling operation, wherein the downhole tools 31, 33 are suspended within a relatively small diameter drill pipe. Alternatively, the tools or detectors 31, 33 may be suspended within a cased or open hole (as shown in FIG. 1) to perform operations or detect parameters when drill pipe is not present. During such operations, whether or not drilling is taking place, the wellbore provides a hostile environment to any transmission line and transmission system which is used. In the past, a great deal of effort has been expended in trying to develop various data transmission systems to overcome the inherent difficulties of the wellbore or borehole environment. Such systems include, but are not limited to, acoustical systems which attempt to transmit acoustical data pulses through drill pipe, casing, or the earth itself, or combinations of these mediums. Hardwire systems have attempted to use one or a plurality of conductors attached to pipe in the wellbore. In recent years, mud pulse systems have effectively utilized the application of pressure pulses to borehole fluids in order to transmit between the bottom and surface of a borehole. Probably the oldest and still the most reliable scheme for transmitting electrical signals within a borehole environment is a wireline transmission system, wherein the transmission medium is a cable normally comprised of a single conductor or sometimes multiple conductors encased in an armored sheath for providing a rugged transmission medium that will withstand the rigorous mechanical and chemical environment typically constituting the borehole. All of the systems thus far described have advantages and disadvantages relative to the various environmental circumstances and physical limitations encountered in borehole operations. However, one of the most prevalent problems with all of the systems is that of data rate and, in particular, a high quality data signal at a reasonable data rate. As well tool state of the art has become more sophisticated with the advent of electronic detection and data processing systems, advances in wellbore transmission systems have been hampered by the limitations imposed by available transmission paths, i.e. pipe, earth, drilling fluids, and wireline cables. In many operations, the only medium available, or at least desirable for the transmission system, is the wireline cable. Because of the construction limitations imposed on such cable by the depth of the well and requirements for strength, sheathing, etc., the transmission quality of such cable has been limited. Typically, such cable of the highest quality has a roll off frequency of approximately 5.6 KHz, which would permit a 2.4 KBaud data rate, assuming that the date rate, by commonly used design criteria, is normally calculated to be 1/1.5 times the roll off frequency. One application for which the present invention is being utilized is to measure the orientation of a borehole bit being operated by a turbine. A useful data rate in such a system needs to be on the order of 10 KBaud. Thus, applying standard design criteria to select a transmission medium, this baud rate would require a transmission medium having a roll off of 15 KHz. The problems associated with using a wireline system at a data rate above design frequencies will be outlined below.

Figure 2:
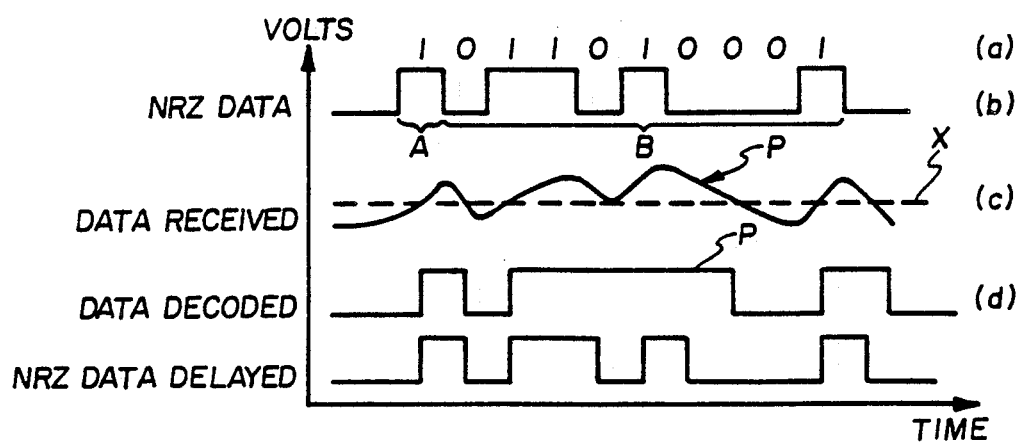
FIG. 2 is a waveform diagram of digital data transmitted and received in accordance with the format of the prior art.

Referring next to FIG. 2 of the drawings, line (a) shows the digital code in the form of "1"'s and "0"'s which it is desired to transmit to a remote location. Line (b) of FIG. 2 shows the digital code converted into an NRZ format for transmission as a two voltage bi-level scheme to represent the digital code in a typical wireline transmission. Line (c) of FIG. 1 shows the average dc level of the signal as it would be received at a remote location after the signal has been subjected to line losses and phase shifting, which are characteristic of the prior art method of transmitting such signals. Line (d) of FIG. 2 shows the reconstituted NRZ data signal resulting from distortions in the data transmission over a wireline. Referring again to i lines (a) and (b) of the drawing, a series of "1"'s and "0"'s, which is digital code representative of data to be transmitted, is applied in sequence to a transmission line in the form of voltage levels. For example, an initial start up sequence A is comprised of a positive voltage level applied to the line for a predetermined period, in this instance for one bit period, to represent a synchronization signal. The data sequence occurs at B, wherein the first data bit corresponding to the "0" in line (a) is at a zero voltage level. The next two data bits in period B represent a "1", as shown in line (a), wherein the voltage level increases to an increased voltage level, of say, 50 volts, and so on in this fashion until the data frame is completed, wherein no data is then transmitted for a period of time until and after the next ensuing start up sequence A is transmitted.

At the receiving end of the system, all data streams contain a dc or average component associated with them, which is data dependent, as shown in line (c) of FIG. 2. When a "1" is transmitted as a positive voltage, as used in the instant format, the voltage level rises to an on state for a bit period. If the data state changes to a "0", the dc component of the data stream on the line begins to decay. This corresponds to the portion of line (c) of FIG. 2 associated with part A of line B. Another portion of the data sequence is "up" (representing sequential "1"'s) for two bit periods and the dc component raises to a level that does not decay as rapidly as before, and thus the voltage level has now risen. In this manner, after a string of "1"'s, the voltage level of a succeeding "0" may not decay below a threshold x, line (c), and thus be mistakenly read as a "1". Thus, at the received end of the system, the voltage level on the line represents an average level, which is directly related to the rate of change of the transition between voltage levels, i.e., it depends upon the amount of time at the previous level, as well as the amount of time at the new level. This average component of the data pushes and pulls the average signal level on the wireline up and down, as shown in line (c), and phase distortion results. If the phase shift becomes significant enough, as is shown at point P on lines (c) and (d), the data bit, as reconstructed in NRZ format on line (d) at point P, can be misinterpreted, in that the voltage level being detected by the receiver may be interpreted to be at a level representing a "1" rather than the "0", which was transmitted at the transmitting end of the system. It is noted that at point P of line (c) that the time intervals of the transitions are difficult to discern, and the two-step voltage format no longer appears in the discrete voltage level form shown in line (b). Phase error, as well as line losses, have produced an average voltage component characteristic of rounded corners and ill defined upward and lower voltage level conditions. Therefore, it is hard to detect from line (c) where a particular data pulse begins or ends, and consequently it is difficult to detect and decode the waveform of line (b). As shown in line (d) of FIG. 1, the waveform can be misinterpreted from the data received to provide an error, as shown at P.

Figure 3:
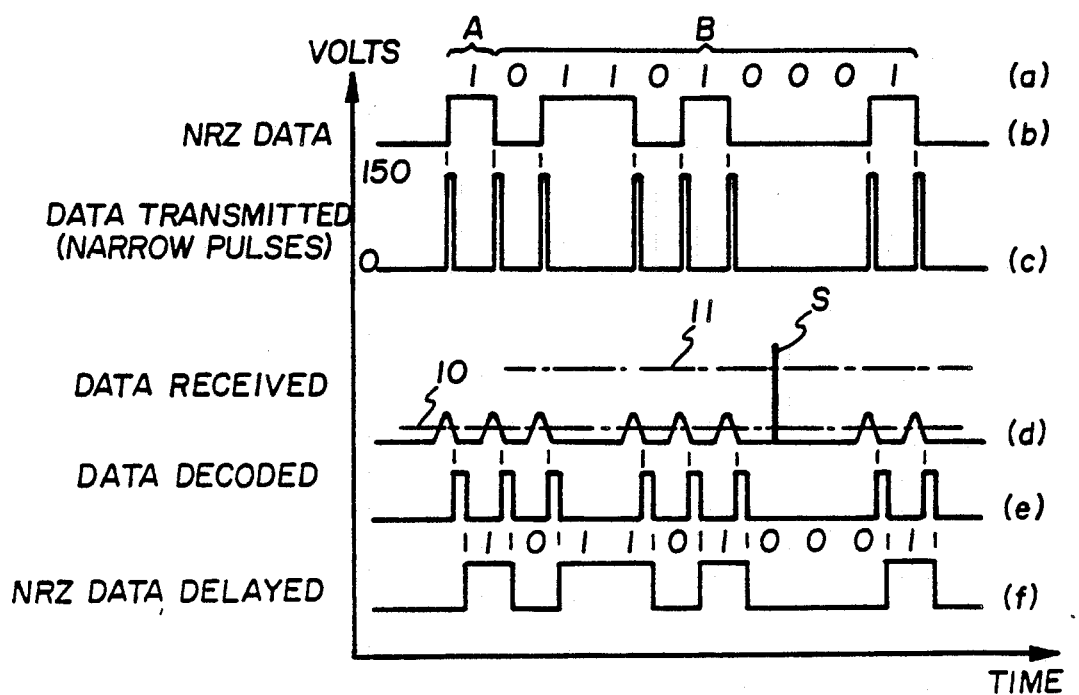
FIG. 3 is a waveform diagram of digital data encoded, transmitted in narrow pulses, received at another location, and reformatted in the original data format in accordance with the present invention.

Now referring to FIG. 3 of the drawings, the same data stream of "1"'s and "0"'s, and corresponding NRZ format bi-level waveform, as shown on line (b) of both FIGS. 2 and 3, are utilized as a starting point for describing the functional features of the invention described herein. Reiterating the data stream as shown with respect to FIG. 2, FIG. 3 also shows the initial start-up sequence, as indicated at A on line (a), followed by the first data bit indicated at B, etc., until the nine data bits comprising the data word are composed. Together they constitute a data burst or data sequence. Each bit of the word or sequence is of the same time interval, which is predetermined for a particular data transmission rate. In the format used as an example here, each "1" data bit of the data word is at the same relatively high fixed voltage as the initial "1" start up sequence, and each "0" data bit of the data word is at the same relatively low or zero fixed voltage. These voltages, of course, can be any value, including zero, but typical values used are, say, on the order of +150 volts for "1"'s and 0 volts for "0"'s. In one of the preferred embodiments, "1"'s are characterized by a drop of voltage to a low level, such as zero volts, and "0"'s are characterized by a higher level, say, 150 volts. Thus, it is seen that polarity and amplitude may follow a variety of formats which may be desirable for some other functional reasons.

The transition edge of the initial "1" (e.g., B in FIG. 3) is the start of and first bit of the data word. This starting bit edge, and each transition edge thereafter, can be used to generate a corresponding short duration pulse. Such a short duration pulse can be generated by a one-shot multivibrator, although other circuit components can be employed, as well. Therefore, as shown by the waveform on line (c) in FIG. 3, there is a short pulse generated each time there is a change of data bit state, i.e., that each time there is a transition between data bit states. This pulse typically has a duration of, say, 1 to 10 microseconds. The loss characteristics of the line and data rate determine the duration of the short duration pulse. At present, a 1 to 3 microsecond pulse is optimally being used in the system. The width (frequency) of the short duration pulse will be determined in the system of the present invention primarily by the baud rate. The baud rate determines the bit period, the width of which is the inverse of the baud rate. Therefore, if we wanted to have a baud rate of 10,000 bits per second, we would have a bit width of 100 microseconds. If we were to use the full bit period to present a "1" or "0" bit state, as typically used in prior art NRZ transmissions, we would generate, at some time in the data stream, a substantial average dc voltage on the wireline, as shown at FIG. 2 line (c), which will tend to generate a phase shift problem on the wireline.

To avoid this phase shift error in the present transmission system, a narrow pulse is used during some fractional portion of the bit period to represent the transition between bit states, as shown at line (d) of FIG. 3. A preferred format would be to generate the narrow pulse at the beginning of the bit period to occupy no more than 25% of the bit period on the transmission end of the system. Thus, on the received end of the system, even with the effect of phase distortion and line loss, the narrow pulse will have decayed to its pre pulse state during the bit period in which it was transmitted, and therefore not present any residual decaying voltage in a subsequent bit period which might lead to a false interpretation of the voltage level state in such subsequent bit period.

There is no pulse generated when there is a "1" followed by another "1" or a "0" followed by another "0", since no transition occurs. A pulse occurs only when a transmission from a "1" to a "0", or vice versa, occurs. This again prevents the average dc voltage level from rising to the level of creating a large phase shift of a signal on the line. The procedure herein calls for the high frequency, short duration pulses occurring at the leading edges of the data bit transitions to be impressed on the wireline transmission medium at the transmitter location. It should be noted that positive going pulses are shown for simplicity of illustration. In actual practice, these pulses may be made to be negative-going, and in fact such negative going pulses may require less power, in that in the apparatus for generating the bi-level state, it would only be necessary to ground the positive charged wireline circuit. In the environment of borehole system, where power requirements may be critical, such a use of negative going short duration pulses might be more desirable than that described above with respect to FIGS. 2 and 3. If it were desired, however, to run the wireline in a negatively-charged state for some portion of the time, then the narrow pulse would be made to be positive-going. This could occur if you had two tool systems at the bottom of the wellbore and you reversed the polarity of the system in order to run one of the tool systems as opposed to the other.

Continuing the discussion with respect to FIG. 3 of the drawings, line (d) of FIG. 3 shows the waveform as it might appear at the receiving end of the wireline transmission system. The high frequency short duration pulses which were impressed on the wireline (line (c), FIG. 3) are greatly attenuated by losses and phase distortion, as discussed above. Phase distortion, however, is not bothersome as to the short duration pulses, since the voltage level is low, and therefore the average value of the signal voltage received changes very little, and thus the voltage decays to its pre pulse state well within the bit period. A comparison between line (c) of FIG. 2 and line (d) of FIG. 3 shows the difference between the prior art method of using an NRZ format to transmit the data signal over the wireline, as compared to the short duration pulses of the present invention. It is significant to note that the individual pulse waveforms shown in line (d) of FIG. 3 would be greatly time shifted with respect to the transmitted pulses of line (c), over a long wireline, but such received pulses are only slightly phase shifted with respect to each other.

Figure 5:
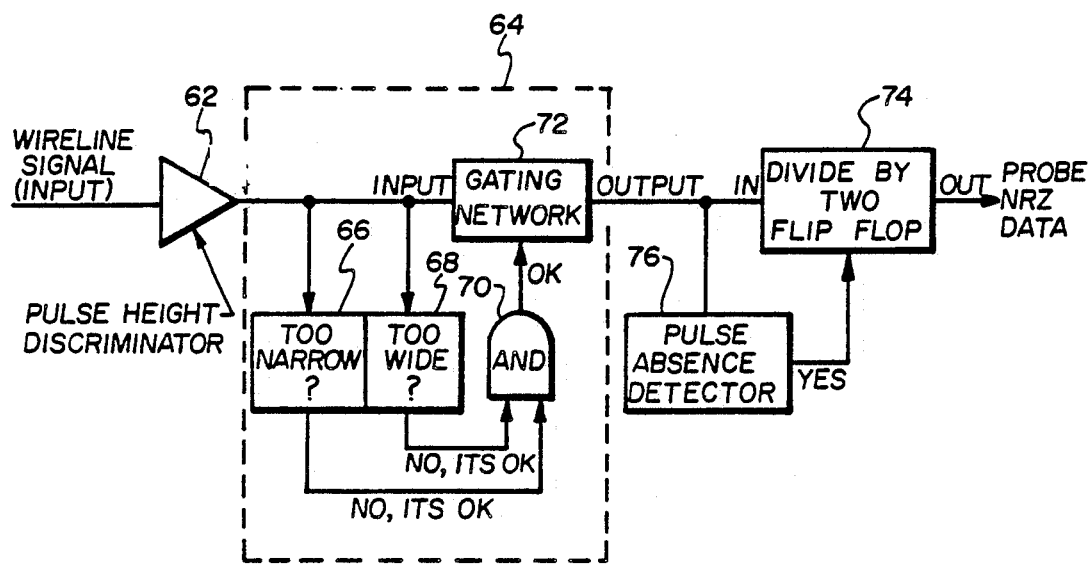
FIG. 5 is a detailed block diagram of the surface receiver portion of the block diagram of FIG. 4.

With respect to line (d) in FIG. 3, upper and lower threshold levels 11 and 10, respectively, are shown as dotted lines. Threshold detectors to be described herein with respect to FIG. 5 are used in the system to detect the occurrence of the short duration pulses as occurring at a voltage level between the threshold levels. Therefore, if noise exists on the line, an additional method of detecting such noise is provided by determining whether the signal in question occurred within the voltage range defined by the thresholds 10 and 11. If the peaks of voltage on the line were to be above the threshold 10, but below threshold 11, the signal would be received and reconstructed as a data signal. If noise were present on the line which did not provide a signal level above the threshold 10, no data signal would be received and reconstructed in accordance therewith. If the voltage peak is above threshold 11, likewise, no data signal is seen.

At the receiver end of the system, there is also a circuit following the signal detector that regenerates a single pulse, shown at line (e), for each of the detected data bit transition pulses of line (d), FIG. 3. It should be noted that such pulse may be established at the time the pulse reaches the detected threshold level, or when it passes back through the threshold level, as shown at line (e). This refinement in the procedure can require that the detected pulses be above the threshold level 10 for a time duration within a predetermined range of time with no portion of the pulse being in excess of the second amplitude threshold level 11. Again, such procedural refinements would further assure against mistaking noise for a signal. Here it should be noted that the spike "S" of noise shown in line (d) of FIG. 3, while being above the threshold level 11 and thus detectable as noise for that reason, is also more narrow than the predetermined range of time which may be allocated to a valid data pulse. Either of these parameters would place the noise spike outside the threshold detectors of the system, and therefore the surface reconstruction of the signal would eliminate the spike "S". The circuitry at the receiving end of the system for regenerating a data signal must determine if a pulse appearing on the wireline from the downhole or otherwise remote location, meets the time and amplitude threshold criteria of the system in order to detect and thereby eliminate noise signals from the system. If such a signal, at the received end of the system, passes the time and amplitude threshold criteria, a pulse is placed on the data received output line, as shown at line (e). Although this overall transmission system may shift the data with respect to time, i.e., the real time frame at which it was transmitted at the remote location, all of the data is shifted equally so that when the data pulse of line 3(e) is used to reconstruct the digital data line 3(f) in the original NRZ format, such shifting causes no data loss.

The regenerated pulse resulting from detecting a data pulse is shown at line (e) and can be at a considerably lower voltage value than the pulses transmitted by the transmitter at the transmitting location, since they are only being generated at the received location for subsequent local processing. In addition, these regenerated pulses, such as shown in line (e) of FIG. 3, can each have a wider pulse width than the narrow transmitted pulses, but such regenerated pulses should still be at a fraction of the period for an entire data bit. Finally, in the system of the present invention, the regenerated pulses of line (e) FIG. 3 are used to reconstruct the two level data format shown at line (f) in FIG. 4, i.e., the NRZ format in which the signal was transmitted, as shown in the top waveform (b) of FIG. 3.

Figure 4:
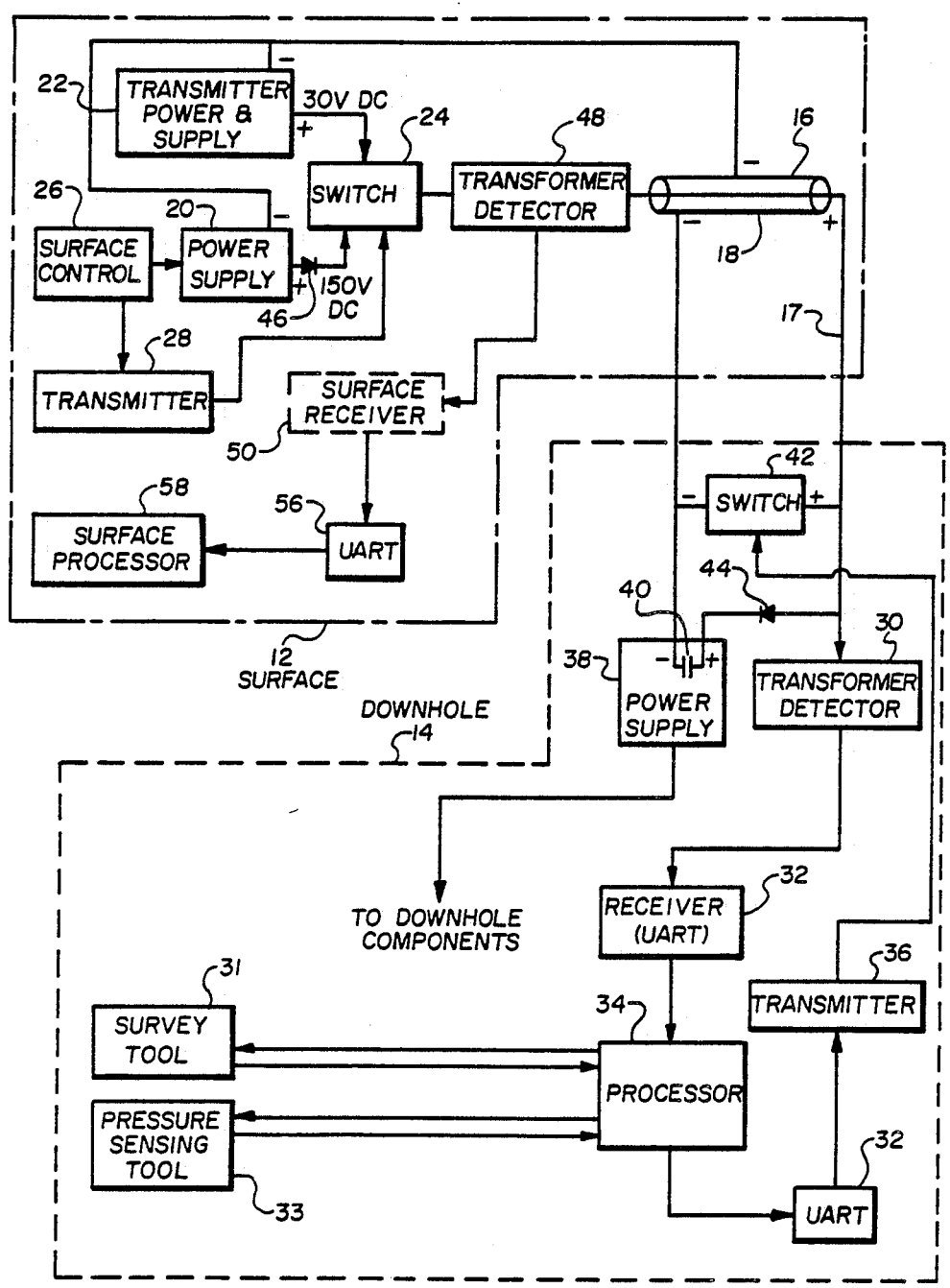
FIG. 4 is a block diagram of a wireline data transmission system in accordance with the present invention.

Referring now to FIG. 4, a block diagram shows surface electronics 12 at the top of the wellbore and downhole electronics 14 at the downhole tool location connected by a wireline 16. The scheme described herein may be used for transmitting data from downhole to the surface or from the surface to downhole, or in both directions. The wireline may be a single or multiple wire conductor 17 which has a grounded sheath or cable 18, as shown diagrammatically connected to the negative side of the circuit path. Surface power supply 20 provides the nominal operating voltages for system operation and in the system described produces, as for example, a positive dc output at 150 volts or more. It should be noted, however, that this system will perform even if the surface power supply is not used or present. The downhole electronics can be battery powered and still provide pulses with the characteristics previously described. A second power supply 22 serves as a surface transmitter power supply and produces a constant level positive 30-volt output which is connected by way of electronic switch 24 to add its voltage to that of a power supply 20. Thus, when the switch 24 is open, only 150 volts are applied to wireline 16. When switch 24 is closed, however, 180 volts are applied to the wireline.

Surface control 26 turns on main power supply 20 and surface transmitter 28, which, in turn, operates the opening and closing of switch 24. Surface control 26 is arranged for either manual or automatic keying. An arrangement that may be used utilizes a waveform to be transmitted downhole for controlling the tool operation, which waveform may, for example, be comprised of conventional frequency shift coded bits. The amplitude of the coded frequency signal is, in this example, 30 volts when switch 24 is closed. This system disclosed for transmitting control signals downhole recognizes that at a low data transmission rate used for downhole tool control, the roll off loss of the wireline is sufficiently small to utilize a coded control signal to operate the downhole electronics without undergoing the data bit transformation of the present invention. Such data bit transformation is then utilized for uphole transmission, as described below. This would be because the surface to downhole transmission frequency is below the wireline cut off, i.e., less than 5.6 KHz.

The downhole system 14 includes a downhole transformer 30 for detecting a change of current on the line. If a coded control signal is being transmitted from the surface, the current change is frequency modulated with one frequency representing a positive ("1") data pulse and the other frequency representing "0" low voltage level. As described earlier, this polarity can be reversed. When the current level changes on the wireline, the transformer 30 will see such a change, representing frequency shifts to "1" or "0". If the data pulse were originating at the surface, it would likely be a control data pulse being transmitted to the downhole tool. Downhole detector 30 utilizes these detected frequency shifts from the transformer to produce control instructions in the form of information frequency shifts which may then be reconstructed into a two level NRZ format, or the like, for operating downhole equipment. The frequency shifts enter a phase-locked loop, whose phase detector produces the "1" or "0" for the high or low frequency received. These "1" and "0" NRZ bits are sent to a Universal Asynchronous Receiver-Transmitter 32 for synchronization. These control bits determine the operation of a downhole tool control or processor 34, which is shown outputting to sensing transducers 31, 33 used for detecting downhole condition parameters. For example, a pressure transducer 33 could be enabled by a signal from receiver 32 to processor 34 to sense the downhole pressure of the wellbore and, accordingly, to produce a digitally encoded output representative thereof to downhole transmitter 36. A second transducer 31 could be time shared to produce a similar signal as a measure of wellbore position, orientation or the like. Alternatively, the control signals can be used to alter the operating mode or computation constants in the downhole processor 34.

Downhole power supply 38 produces the miscellaneous small voltages for the electronics located downhole and the 150 volt output typically used for the production of high frequency, short duration pulses. The power supply 38 is a converter which utilizes the wireline voltage to produce the 250 volts or the like utilized by the various downhole components of the system. An internal capacitor 40 is maintained charged and isolated by diode 44 for producing the small voltages required for operating the electronics when the 150 volt output line is shorted to ground during the data pulse production, as described below. Thus, a constant supply of low voltage is provided to the downhole components. When a pulse is produced by an output from downhole transmitter 36, switch 42 is closed and a short high frequency pulse is produced like that shown in line (e) of FIG. 3. This pulse may typically be in the range of one to ten microseconds. It is to be noted that the grounding of the wireline system, as just described, will produce a negative pulse rather than the positive pulse shown in FIG. 3, but that otherwise the concept is the same. It is not important to this invention whether the short pulses are negative-going or positive-going, but it is more typical of a system using a positive voltage main surface power supply for primary power, to use negative pulses and vice versa. Use of the negative pulses with the positive voltage power supply tends to save power and also provides a simple circuit design, in that it only requires grounding the line to provide the short duration pulses. The opening of the switch 42 again allows the wireline to return to 150 volts. When the final bit of a data burst is transmitted, the switch 42 is open. Another Universal Asynchronous Receiver-Transmitter 32 utilizes a crystal controlled system clock to provide precise timing for the format of pulses transmitted to the surface. This format includes the start bit and the stop bit arranged around the data bits passed by the processor 34.

Figure 6A:
FIGS. 6(a) and 6(b) show waveforms associated with the receiver portion of FIG. 5.
Figure 6B:
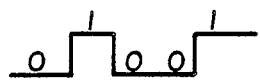

Uphole or at the surface electronics, the pulses of the type shown in line (d) of FIG. 3 are detected by a transformer detector 48, which is connected as the input to surface receiver 50. Similarly to the downhole transformer 30, transformer 48 sees a change in current on the line 17 and provides an output voltage in response thereto to control the generation of a reconstructed data signal. The surface receiver 50 is shown in greater detail in FIG. 5. The surface receiver receives its input from the transformer 48 into a pulse height discriminator 62 which passes pulses that exceed a threshold voltage amplitude. This pulse height discriminator can also be arranged to pass voltages meeting upper and lower threshold limits, as by the use of an analog voltage comparator, which provides the high and low threshold detection function described with respect to levels 10 and 11 of line (d) of FIG. 3. The discriminator 62 thus passes a voltage on the line that has a certain threshold value or range of value to a pulse width or pulse duration discriminator 64. The pulse width discriminator is comprised of a one shot 66 which looks at the pulse duration, and if the pulse lasts for at least some period, say 10 microseconds, then discriminator 66 passes a control signal to AND GATE 70 which is comprised of an exclusive OR and a NAND GATE. A one shot 68 also receives the output of discriminator 62, and it also looks at the pulse duration. If the pulse duration coming from discriminator 62 is not too wide, say its duration is not longer than 51 microseconds, then it also passes a control signal to AND GATE 70. If AND GATE 70 is satisfied by the outputs of discriminators 66 and 68, to be thereby activated, it allows the gating network 72 to pass the input signal from pulse height detector 62. The signal from gating network 72 is then fed to a divide by two flip flop 74 and also to a pulse absence detector 76. The output from gating network 72 to the divide by two flip flop 74, reconstructs the data into an NRZ format. For each pulse that comes into flip flop 74, the output changes its state. FIG. 6(a) illustrates this action of the flip flop. The narrow pulses coming from the gating network 72 are used to change the state of the output of the divide by two flip flop so that the output is the reconstructed NRZ, as shown in (FIG. 6(b).

The other output of gating network 72 passes to a pulse absence detector 76. If pulses are absent for one word time, which for the example used herein is nine bits, or any multiples thereof, then the output of detector 76 presets the divide by two flip flop 74 to the proper state, which in this example is "0", to reconstruct the next start bit and get ready for the next batch of data bits.

The total output of flip flop 74 is the start up sequence plus the data to fully reconstruct the tool transmitted data format from downhole.

The output of the surface receiver 50, just described, is then passed to a UART 56 to resynchronize the data with start and stop bits for the surface processor 58. The surface processor places the data into a form usable by operators at the surface for analyzing the detected borehole parameters. The UART provides a crystal controlled bit time and data baud rate. This in turn identifies precise and fixed format. The UART provides a start bit and a stop bit, and the data bits in between are passed uphole from the downhole processor. At the surface, the UART 56 will be looking for start and stop bits and will eventually strip them off, to only load data bits into the processor 58.

The procedure just described has proven effective for successfully transmitting and receiving data bits in excess of 19,200 bits/second by the application of high frequency pulses of 150 volts on a wireline having a length up to 30,000 feet.

While a particular embodiment of the present invention has been shown and described, it is apparent that changes and modifications may be made without departure from this invention in its broader aspects, and therefore the aim in the appended claims is to cover all such changes and modifications as fall within the true spirit and scope of this invention.

What is claimed is:

1. In a transmission system for sending signals between the surface and downhole in a wellbore, over a wireline conductor path which produces phase distortion of digitally encoded data transmitted in a multi-voltage level digital data format at a baud rate above the cut off frequency of the wireline conductor, means for transmitting data without any phase shift error thereto, which means comprises:
    means generating data signals in a multi-voltage level data format representing data to be transmitted;
    means for detecting the transitions between voltage levels in the multi-voltage level data format;
    means responsive to said detecting means for transmitting a voltage pulse in time relation with the transitions and having a data rate frequency that is at least greater than the cut off frequency of the wireline conductor;
    means for imparting said pulse to the wireline conductor path for transmission to a spaced location; and
    means at the spaced location for detecting said pulse.

2. The wireline transmission system of claim 1 and further, including:
    means responsive to the pulse detecting means at the spaced location for reconstructing said data in a multi-voltage level data format.

3. The wireline transmission system of claim 1, wherein said multi-level voltage data format is comprised of a start up sequence and a word sequence having a series of predetermined bit periods making up each of said sequences, and wherein the voltage level is indicative of the beginning and end of the start up sequence and the data bit state encoded into each bit period.

4. The wireline transmission system of claim 3, wherein said pulse is arranged to have a time relation with the bit period in the word sequence which places the pulse within the first ten percent of the bit period.

5. The wireline transmission system of claim 3, wherein said pulse is placed in timed relation with said bit period so as to occur near the beginning of the bit period and to occupy no more than 25 percent of the total time of the bit period.

6. The wireline transmission system of claim 3, wherein said pulse is placed in timed relation with the bit period so as to occur within an initial portion of the bit period that will permit the pulse voltage to decay to its pre pulse state before the end of the bit period when transmitted over a wireline conductor in a borehole.

7. The wireline transmission system of claim 6 and further, including:
    means responsive to said detecting means for generating a reconstructed data signal in a multi voltage level data format, wherein said reconstructed signal is based on pulses that occur at said detecting means for a predetermined time period.

8. The wireline transmission system of claim 7, wherein said reconstructed signal is additionally based on pulses that have a pulse height above a first predetermined level.

9. The wireline transmission system of claim 8, wherein said reconstructed signal is additionally based on pulses that have a pulse height below a second predetermined level.

10. The wireline transmission system of claim 2 and further, including voltage comparator means for reconstructing data based only on those detected pulses which occur above a predetermined threshold voltage.

11. The wireline transmission system of claim 2 and further, including first pulse width detection means for passing detected pulses which are greater than a first predetermined time period and second pulse width detection means for passing detected pulses which occur within a second predetermined time period, and gate means operable in response to said first and second pulse width detection means for further passing detected pulses to be reconstructed into a data signal in a multi voltage level data format.

12. The apparatus of claim 2, wherein said reconstructing means includes a divide by two circuit means which changes its output state with each pulse input to thereby reconstruct a multi-voltage level data format.

13. The apparatus of claim 2, including means associated with said transmitting means for sequencing a start bit and a stop bit around data bits to comprise the data format, and wherein said reconstructing means further includes a universal asynchronous receiver transmitter for stripping the start bit and stop bit from the data format.

14. The apparatus of claim 2 and further, including a universal asynchronous receiver transmitter for sequencing a start bit pulse and a stop bit pulse in the data format around the data bit pulses being transmitted to the spaced location.

15. A method for transmitting data to be represented in a multi-voltage level digital data format, over a wireline conductor suspended in a borehole at a data rate exceeding the cut off freguency of the wireline conductor, comprising the steps of:
    collecting data from borehole data sensing means in a wellbore;
    formating such collected data into a multi-voltage level digital data format, wherein data states are represented by discrete voltage levels and transitions between data states are accompanied by transitions in voltage levels;
    generating short duration pulses to coincide with the time relationship of such transitions in the voltage levels, such short duration pulses being arranged in a word sequence comprised of predetermined bit periods and occurring at a data rate freguency which is above the cut off freguency of the wireline conductor path; and
    placing such short duration pulses on the wireline conductor near the beginning of a bit period for transmittal to a spaced location without any phase shift error to the transmitted data signal.

16. The method of claim 15 and further, including sequencing a start bit pulse and a stop bit pulse in the data format around a series of data bit pulse bit periods to comprise a data word sequence.

17. The method of claim 15 and further, including placing such short duration pulse on a bit period within the initial 10 percent time span of the bit period.

18. The method of claim 15 and further, including limiting the time such short duration pulses are applied to the wireline to a pulse duration of no more than 10 microseconds.

19. The method of claim 15 and further, including detecting such short duration pulses on the wireline conductor at a spaced location; and reconstructing a multi-level voltage digital data format by generating voltage level transitions in timed relation to the short duration pulses occurring at the data bit periods in the word sequence.

20. The method of claim 15 and further, including detecting short duration pulses on the wireline at the spaced location with a transformer.

* * * * *